(12) United States Patent
Kretzschmann et al.

(10) Patent No.: US 8,172,490 B2
(45) Date of Patent: May 8, 2012

(54) JUNCTION BETWEEN TWO COMPONENTS OF A ROTATING TOOL SYSTEM

(75) Inventors: Uwe Kretzschmann, Besigheim (DE); Jacek Kruszynski, Stuttgart (DE); Benno Spors, Marbach (DE); Wolfgang Bierl, Gueglingen (DE)

(73) Assignee: Komet Group GmbH, Besigheim (DE)

( * ) Notice: Subject to any disclaimer, the term of this patent is extended or adjusted under 35 U.S.C. 154(b) by 951 days.

(21) Appl. No.: 12/084,678

(22) PCT Filed: May 31, 2007

(86) PCT No.: PCT/EP2007/055328
§ 371 (c)(1),
(2), (4) Date: May 5, 2008

(87) PCT Pub. No.: WO2007/147711
PCT Pub. Date: Dec. 27, 2007

(65) Prior Publication Data
US 2009/0283975 A1 Nov. 19, 2009

(30) Foreign Application Priority Data
Jun. 19, 2006 (DE) .......................... 10 2006 028 373

(51) Int. Cl.
*B23B 31/165* (2006.01)
(52) U.S. Cl. ............. 408/240; 279/67; 408/57; 409/234
(58) Field of Classification Search .................. 279/66, 279/67, 112, 20, 155; 408/57, 59, 240; 409/234
See application file for complete search history.

(56) References Cited

U.S. PATENT DOCUMENTS

| | | | |
|---|---|---|---|
| 2,383,688 A * | 8/1945 | Seiter ................................ 279/8 |
| 2,684,249 A | 7/1954 | Woytych | |
| 4,412,767 A | 11/1983 | Schmid et al. | |
| 4,577,875 A | 3/1986 | Miyakawa | |

(Continued)

FOREIGN PATENT DOCUMENTS

DE  37 11 808 C3  10/1988

(Continued)

OTHER PUBLICATIONS

Germany Patent Office Search Report dated Apr. 27, 2007 (3 pages).

(Continued)

*Primary Examiner* — Daniel Howell
*Assistant Examiner* — Paul M Janeski
(74) *Attorney, Agent, or Firm* — Flynn, Thiel, Boutell & Tanis, P.C.

(57) ABSTRACT

A junction between two components of a tool system, that rotates about an axis of rotation, includes a conical seat, on the first component, coaxial to the axis of rotation and which is defined by an annular front face. The second component carries a coupling having a conical surface complementary to the conical seat and an annular end face resting against the front face. A tie bolt axially projects beyond the free end of the coupling pin and engages, in a cavity adjacent to the seat. The junction also has tensioning elements that are actuated from the exterior for mutually bracing the components, which are radially guided in the first component, and which act upon the tie bolt and are functionally linked with joint actuating means for adjustment between detached and tensioned positions. The tensioning elements include ejection portions that can be fitted with a rotatably received rolling element.

23 Claims, 7 Drawing Sheets

U.S. PATENT DOCUMENTS

| | | | | |
|---|---|---|---|---|
| 4,729,702 | A | * | 3/1988 | Kelm .................... 409/234 |
| 4,799,837 | A | | 1/1989 | Vollmer |
| 4,829,862 | A | * | 5/1989 | Keritsis .................... 82/158 |
| 4,919,574 | A | * | 4/1990 | Samyn .................... 409/219 |
| 4,921,376 | A | | 5/1990 | Tani et al. |
| 5,957,467 | A | * | 9/1999 | Hornung .................... 279/49 |
| 6,902,355 | B2 | | 6/2005 | Kress et al. |
| 2002/0067965 | A1 | | 6/2002 | Kress et al. |

FOREIGN PATENT DOCUMENTS

| | | |
|---|---|---|
| DE | 90 06 877.7 U1 | 8/1990 |
| DE | 100 48 910 A1 | 5/2002 |
| EP | 0 026 751 | 4/1981 |
| EP | 0 285 704 | 10/1988 |
| EP | 0 340 026 | 11/1989 |
| EP | 0 463 422 A1 | 1/1992 |

OTHER PUBLICATIONS international Search Report dated Sep. 26, 2007 (5 pages) Form PCT/ISA/210.

Written Opinion of International Searching Authority dated Sep. 26, 2007 (9 pages) Form PCT/ISA/237.

* cited by examiner

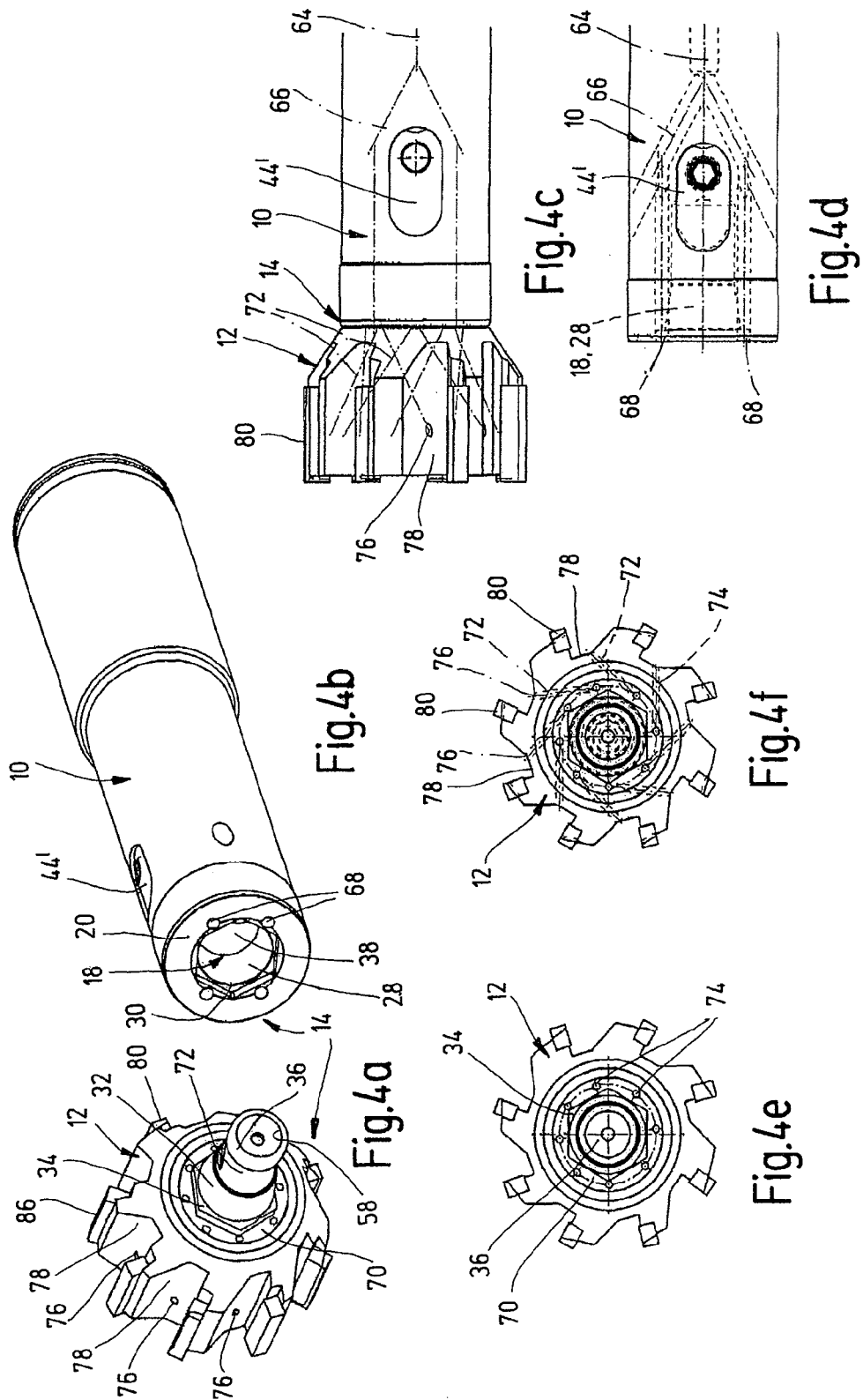

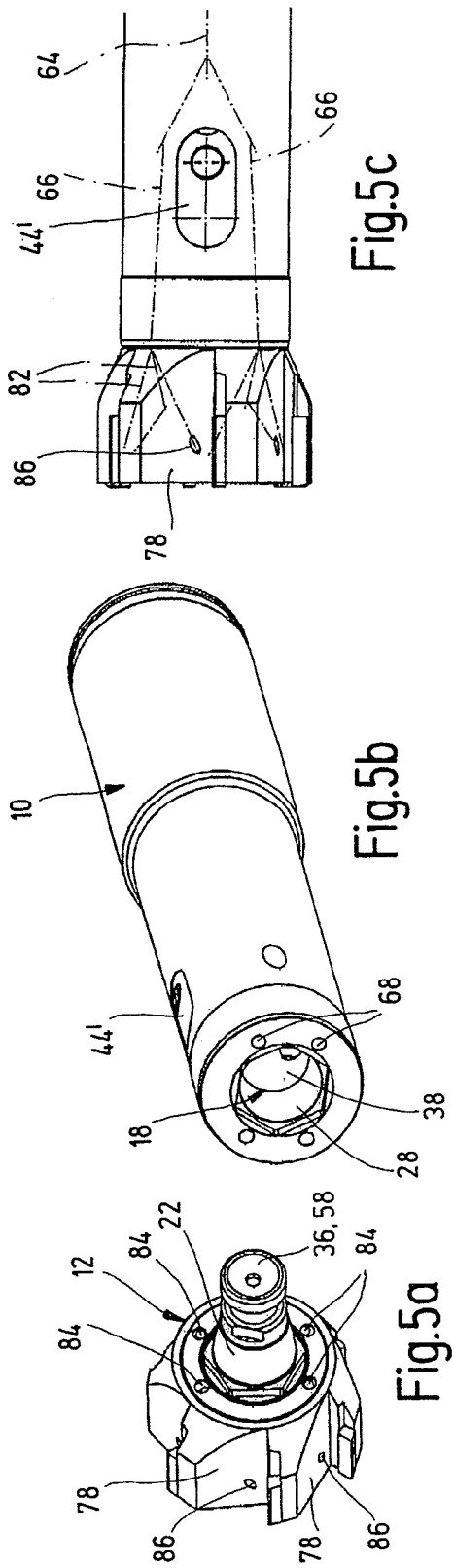

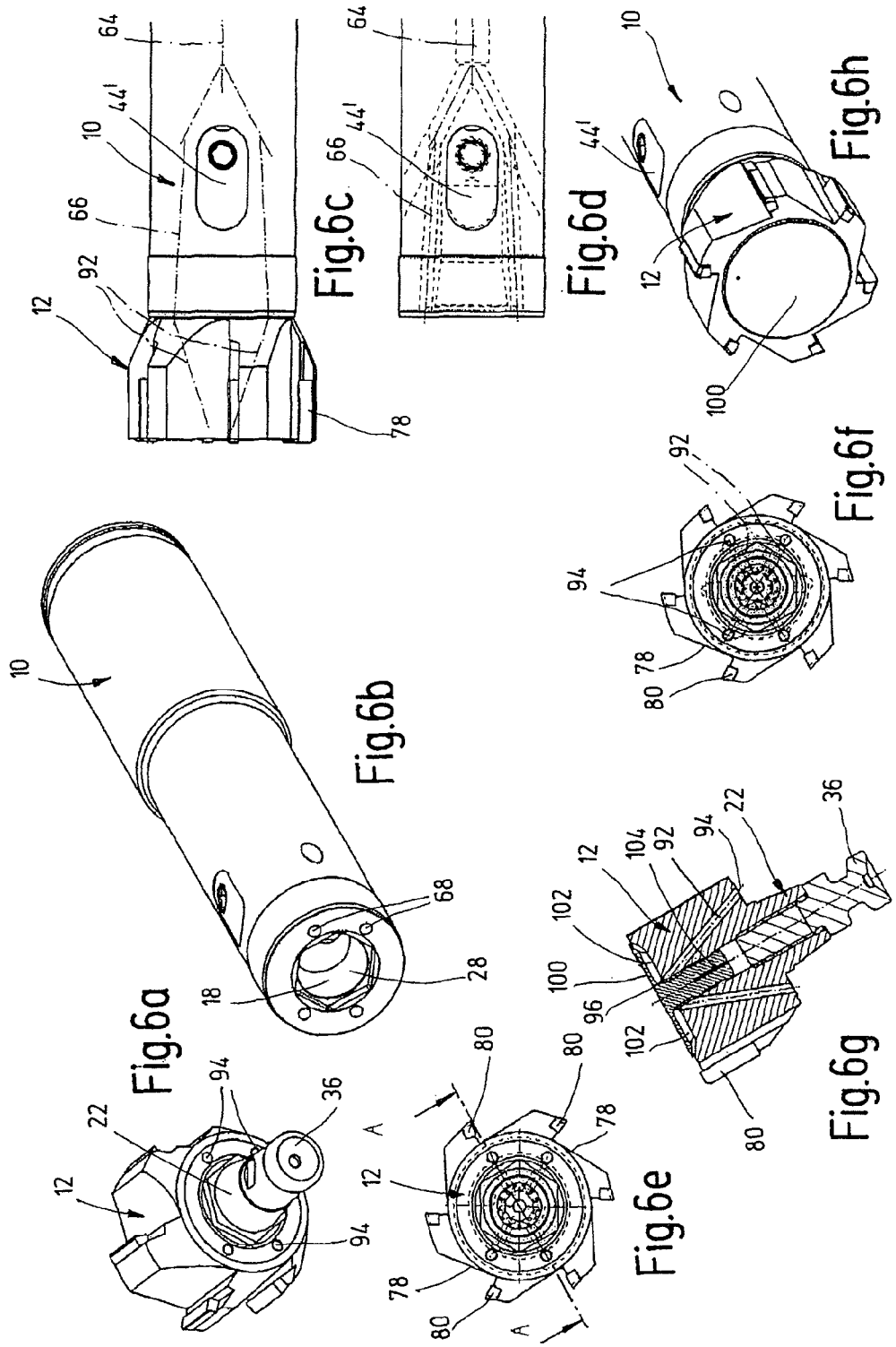

JUNCTION BETWEEN TWO COMPONENTS OF A ROTATING TOOL SYSTEM

The invention relates to a joint between two sub-elements of a tool system which rotates about a rotational axis, in particular for use in machine tools, comprising: an at least partially conical receiver, which is arranged on a first sub-element and is coaxial with the rotational axis, and which is delimited by an annular end face; a coupling portion, which is arranged on a second sub-element and has a coupling pin with a conical surface which is complementary to the conical receiver, and has an annular plane surface which faces towards the annular end face and which, in the coupled state, bears against the latter; a tie bolt, which projects axially over the free end of the coupling pin and which in the coupled state engages in a cavity adjoining the receiver; and clamping means, which can be actuated from the outside, for the purpose of mutual clamping of the sub-elements, which clamping means have two clamping elements routed radially in the first sub-element which are arranged opposite each other relative to the rotational axis and in a clamping position carry wedge surfaces which engage beneath a conical portion of the tie bolt that is concentric with the rotational axis, and which are operatively connected to common actuating means, which are adjustable between a release position and a clamping position. Possible as a first sub-element having a receiver are, in particular, tool spindles, tool adapters or, also, tool holders, whilst in particular tool heads, tool holders or cutting-edge carriers are possible as second sub-elements.

Joints of this type are known in the art (DE-C-37 11 808). Their advantage consists in that radial actuation is possible despite the axially aligned tie bolt provided for clamping the sub-elements. However, it has been found that, owing to the combined conical surface and plane surface clamping, the sub-elements can be released in the region of the joint only with the expenditure of a certain amount of force.

The invention is therefore based on the object of so improving the known joint of the initially specified type that radial clamping and release of the sub-elements is possible with use of the common actuating means, but without radial force.

To achieve this object, the feature combinations specified in claims 1, 14 and 21 are proposed. Advantageous refinements and developments of the invention are disclosed by the dependent claims.

The solution according to the invention proceeds primarily from the concept that the clamping elements are provided with additional ejector portions which, in the releasing of the actuating means from the clamping position, with the exertion of an axial force acting in the ejection direction of the coupling part, strike against an active surface of the tie bolt which faces towards the clamping elements, the active surface on the tie bolt side and/or the ejector portions on the clamping element side being able to be equipped with at least one rotatably mounted rolling element. The rolling elements ensure that the transfer of force can be effected without friction, and therefore without radial force, even in the ejection operation. The rolling elements can be realized in a spherical, barrel-shaped or cylindrical form.

A preferred embodiment of the invention makes provision whereby the active surface on the tie bolt side constitutes an internal cone, and the clamping elements have an ejector portion which, in the release operation, strikes against the internal cone and runs radially on the latter with the rolling elements. The ejector portions can be formed, respectively, in the form of a projection, an inclined surface on the clamping elements, or constituted by the rolling elements.

A further improvement of the transfer of force without radial force in the clamping and releasing operation is achieved in that the clamping elements are routed in a floating manner in a radial guide of the basic body. The actuation means in this case are expediently realized as a differential screw, respectively having a threaded portion, provided with contradirectional thread leads, which engage in the two clamping elements. Advantageously, arranged in the first sub-element are stops, which delimit the motion path of the clamping elements in the release operation. The stops in this case can be constituted by cap screws which by means of their head engage in the motion path of the clamping elements.

A further preferred development of the invention makes provision whereby a respective rotary driving portion is arranged in an intermediate region between the end face and the plane surface on the one hand and between the conical receiver surface or pin surface and the conical surface on the other hand, which rotary driving portions can be realized as polygonal surfaces which are complementary to each other.

A further preferred development of the invention makes provision whereby the actuating means realized as a differential screw extends through the clamping elements outside the part which receives the tie bolt, and the transverse dimension of the clamping elements in the region of the actuating means is greater than in the region of the parts comprising the tie bolt.

According to an advantageous or alternative development of the invention, the sub-elements have cooling channels which communicate with each other, at least one intake channel, routed around the clamping elements to a transfer location, being arranged in the first sub-element and at least one supply channel, connected to the transfer location for a plurality of cutting elements, being arranged in the second sub-element. In this case, according to a first embodiment variant the transition location can be realized as an annular channel communicating with the at least one intake channel and the at least one supply channel. The annular channel in this case can be delimited by a circumferential groove in one of the sub-elements and by a parting surface overlapping the groove in the other sub-element. According to a second embodiment variant, the transition location is constituted by congruent transition openings in the two sub-elements, the supply channels branched-off from the transition openings being able to emerge in the region of cutting elements in the second sub-element.

According to a third embodiment variant, there is provided a distributor piece which engages in the supply channel and which comprises distributor grooves leading to the individual cutting elements and communicating with the supply channel. The distributor piece in this case can have a plug-in pin which engages in the second sub-element in a rotationally oriented manner.

The invention furthermore relates to a rotary tool system for use in machine tools, which system consists of two sub-elements which are connected to each other at a joint of the type described above. The first sub-element in this case can be realized as a machine spindle, an adapter piece or a tool holder, whilst the second sub-element is expediently realized as a tool head.

The invention is explained more fully in the following with reference to exemplary embodiments represented schematically in the drawing, wherein:

FIGS. 1a to c show a side view and two longitudinal sections of a joint of a tool system with an axial tie bolt and with an actuating mechanism which can be actuated radially;

FIGS. 1d to f show two side views and a diagrammatic representation of the clamping elements of the actuating mechanism according to FIGS. 1a to c;

FIGS. 2a to c show representations corresponding to FIGS. 1a to c for a further exemplary embodiment of a joint of a tool system with an axial tie bolt;

FIGS. 2d to f show two side views and a diagrammatic representation of the clamping elements of the actuating mechanism according to FIGS. 2a to c;

FIGS. 3a and b show a side view and a diagrammatic representation of the tool head according to FIGS. 1a to c;

FIGS. 4a and b show two sub-elements of a tool system which can be connected to each other at a joint, with integrated coolant transfer;

FIGS. 4c and d show a side view of the coupled sub-elements and a side view of the first sub-element of the tool system according to FIGS. 4a and b with indicated coolant channels;

FIG. 4e shows a bottom view of the second sub-element according to FIG. 4a;

FIG. 4f shows a representation corresponding to FIG. 4e, with indicated coolant channels;

Figure 1A:
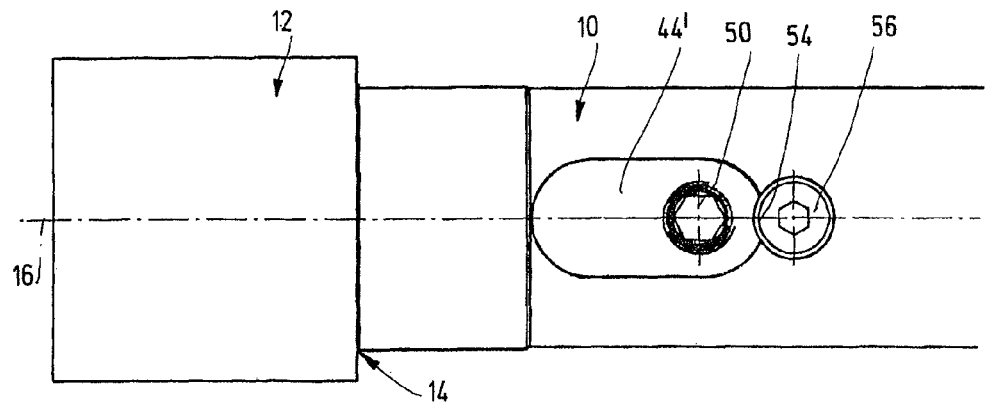

FIGS. 5a and b show two sub-elements of a tool system which can be connected to each other at a joint, with coolant transfer modified in comparison with FIG. 4;

FIGS. 5c and d show a side view of the coupled tool system and of the first sub-element of the tool system, with indicated coolant channels;

FIG. 5e shows a bottom view of the second sub-element according to FIG. 5a;

FIG. 5f shows a representation corresponding to FIG. 5e, with indicated coolant channels;

FIGS. 5g and h show sections according to the section lines A-A and B-B of FIG. 5e;

FIGS. 6a and b show two sub-elements of a tool system with coolant routing modified in comparison with FIGS. 4 and 5;

FIGS. 6c and d show side views of the coupled sub-elements and of the first sub-element according to FIGS. 6a and b with indicated coolant channels;

FIG. 6e shows a bottom view of the second sub-element according to FIG. 6a;

FIG. 6f shows a representation corresponding to FIG. 6e with indicated coolant channels;

FIG. 6g shows a section along the section lines A-A of FIG. 6e;

FIG. 6h shows a diagrammatic end-face view of the sub-elements according to FIGS. 6a and b coupled to each other.

The tool systems represented in the drawing are rotary tools for use in machine tools realized, for example, as reamers. The tool system consists, in essence, of a first sub-element 10 which, in the case of the exemplary embodiment shown, is realized as a tool holder or machine spindle, and of a second sub-element 12, which is realized, exemplarily, as a tool head. The two sub-elements 10, 12 are detachably connected to each other at a joint 14. In addition, a transfer of coolant from the first to the second sub-element 10, 12 occurs at the joint 14.

Figure 1B:
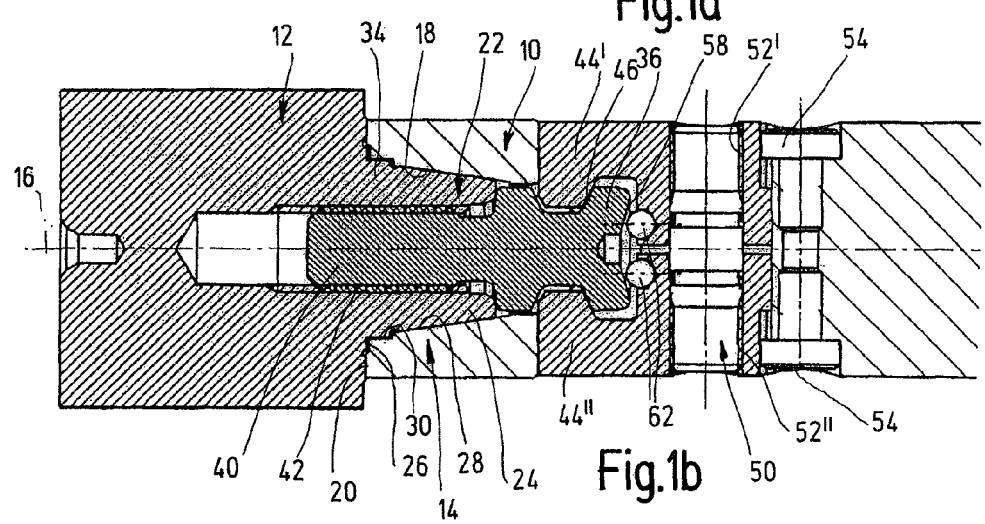

The joint 14 has a receiver 18, which is arranged on the first sub-element 10, is coaxial with the rotational axis 16 of the tool system, and is outwardly delimited by an annular end face 20. The joint 14 further comprises the coupling portion 22, which is arranged on the second sub-element 12 and which has a coupling pin 24 and has an annular plane surface 26, which faces towards the annular end face 20 of the first sub-element 10 and, in the coupled state, bears against this end face. The receiver 18 has, in its interior, a conical receiving portion 28 and a rotary driving portion 30, which is arranged between the conical receiving portion 28 and the end face 20 and is realized as a polygonal surface, whilst the coupling pin has a conical surface 32 which is complementary to the conical receiving portion 28, and has a polygonal rotary driving portion 34 which is arranged between the conical surface 32 and the plane surface 26 and is complementary to the rotary driving portion 30. A tie bolt 36 projects axially at the free end of the coupling pin 24 and, in the assembled state, engages in a cavity 38 of the first sub-element which adjoins the receiver 18. The tie bolt 36, by means of an axially projecting threaded shaft 40, is screwed into a threaded bore 42 of the second sub-element, where it is fastened in a rigid manner. The joint 14 additionally has clamping means 44 for mutual clamping of the sub-elements 10, 12, which clamping means has, in the region of the cavity 38 in the first sub-element 10, two radially routed clamping elements 44', 44" which are arranged opposite each other relative to the rotational axis 16 and which, in the clamping position shown in FIGS. 1b and c, carry wedge surfaces 48', 48" which engage beneath a conical portion 46 of the tie bolt 36 that is concentric with the rotational axis 16. The clamping elements 44', 44" are operatively connected to common actuating means 50, which are adjustable between a release position and a clamping position. The actuating means 50 are realized as a differential screw, respectively having a threaded portion 52', 52", provided with contradirectional thread leads, which engage in the two clamping elements 44', 44". Additionally arranged in the first sub-element 10 are stops 54, which delimit the motion path of the clamping elements 44', 44" in the release operation. The stops 54 in this case are constituted by the head of a respective cap screw 56 which engages in the motion path of the clamping elements 44', 44".

Figure 1C:
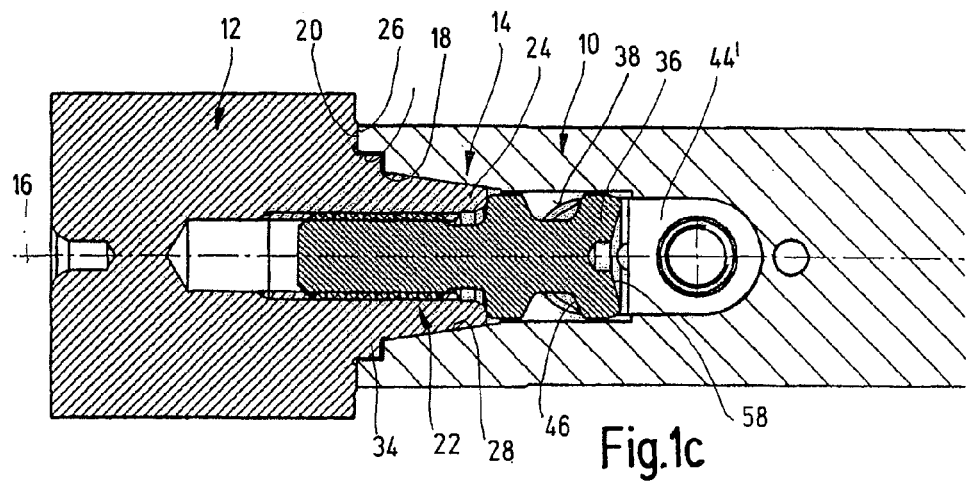
Figure 1D:
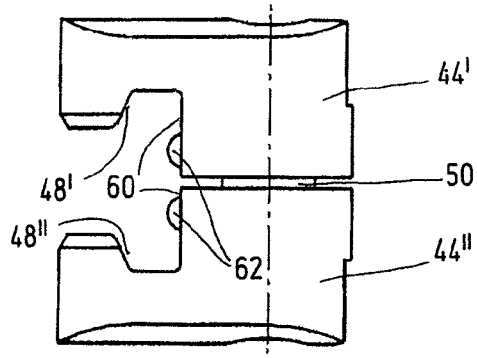
Figure 1F:
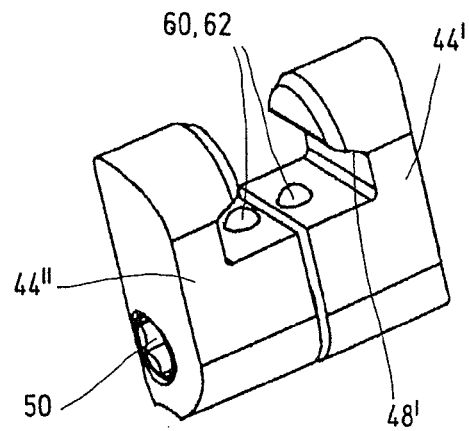
Figure 1E:
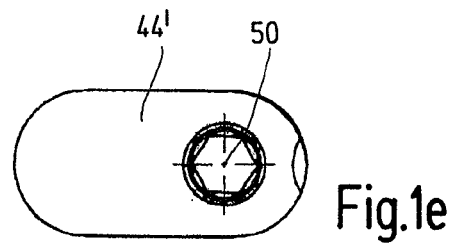
Figure 2D:
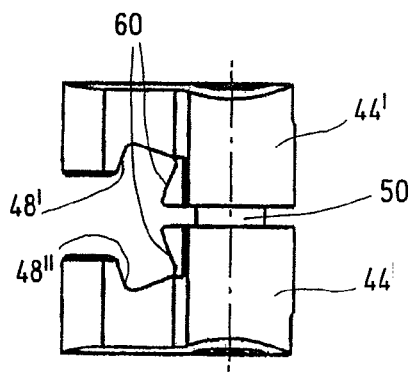
Figure 2F:
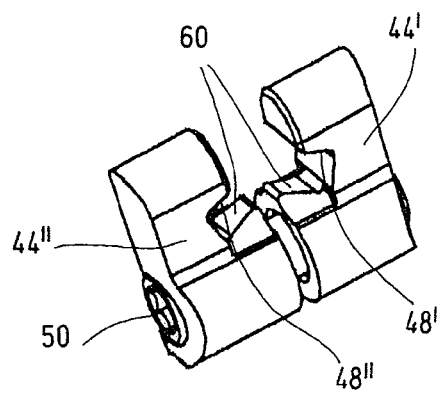
Figure 2E:
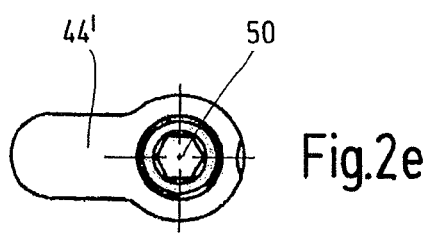
Figure 3A:
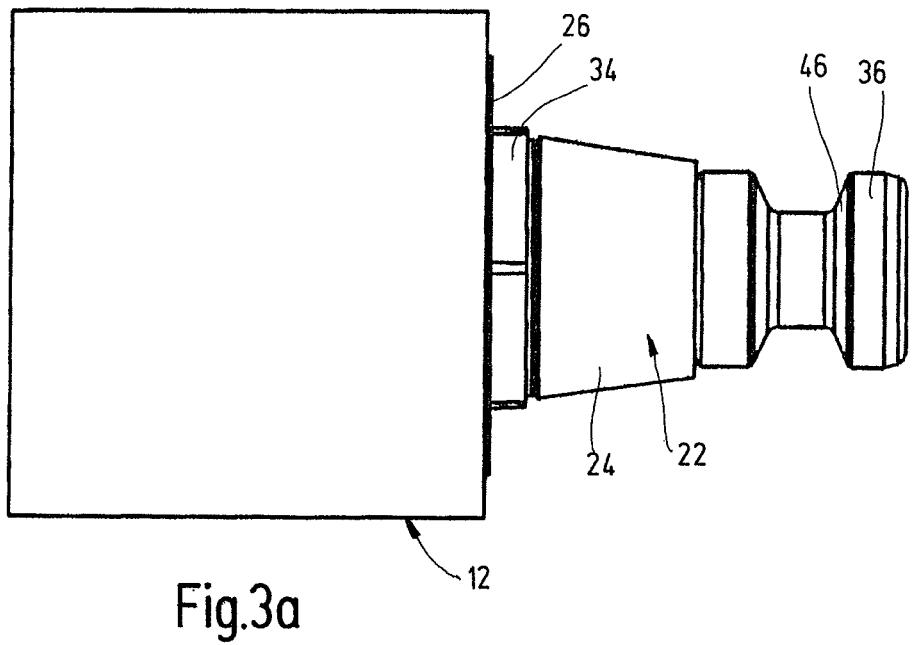
Figure 3B:
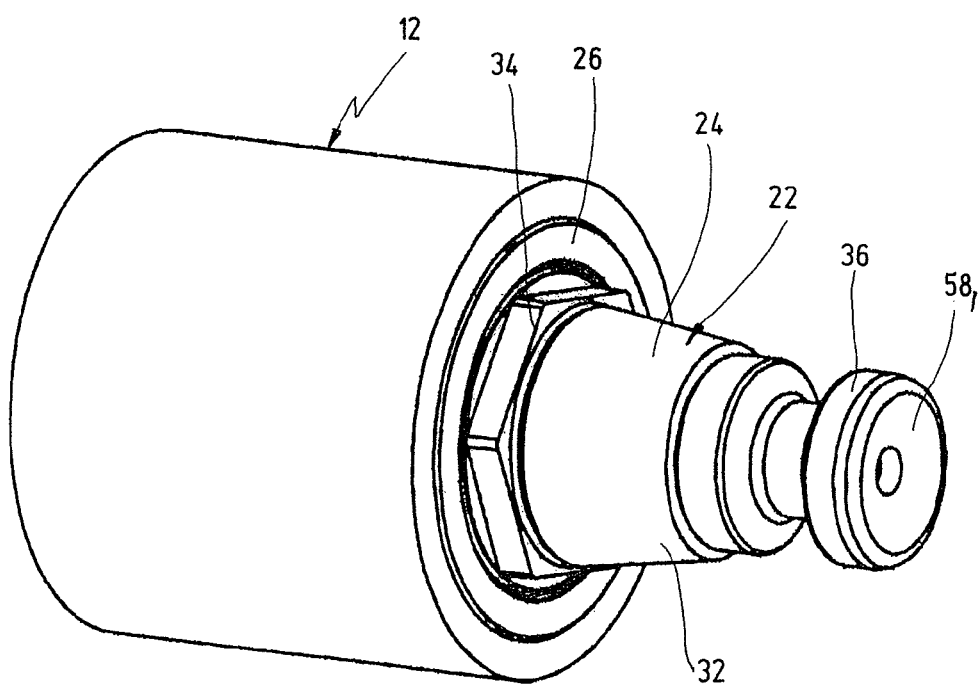

A special feature of the invention consists in that the clamping elements 44', 44" are provided with ejector portions 58 which, in the releasing of the clamping elements from their clamping position, by means of the differential screw 50 and with the exertion of an axial force acting in the ejection direction of the coupling part 22, strike against an active surface 58 of the tie bolt 36 which faces towards the clamping elements. In the case of the two embodiments according to FIGS. 1a to c and FIGS. 2a to c, the active surface on the tie bolt side is realized as an internal cone. In the case of the exemplary embodiment according to FIGS. 1a to c, spherical rolling elements 62 are rotatably mounted in the region of the ejector portions 60 on the clamping element side. In the release operation, the rolling elements 62 roll on the conical active surface 58 of the tie bolt 36, such that the coupling part 22 is forced, together with the second sub-element 12, out of the receiver 18. As soon as the clamping elements 44', 44" are sufficiently far apart from each other, the second sub-element 12, with its tie bolt 36, can be drawn out of the receiver 18, through the gap between the clamping elements 44', 44". For the purpose of insertion, the two clamping elements 44, 44' must likewise be sufficiently far apart from each other, so, that the tie bolt 36 fits through the gap and can be engaged by the wedge surfaces 48', 48" on the conical portion 46 during the subsequent clamping operation. The clamping elements 44', 44" equipped with the rolling elements 62 are shown in detail drawings in FIGS. 1d to f.

Figure 2A:
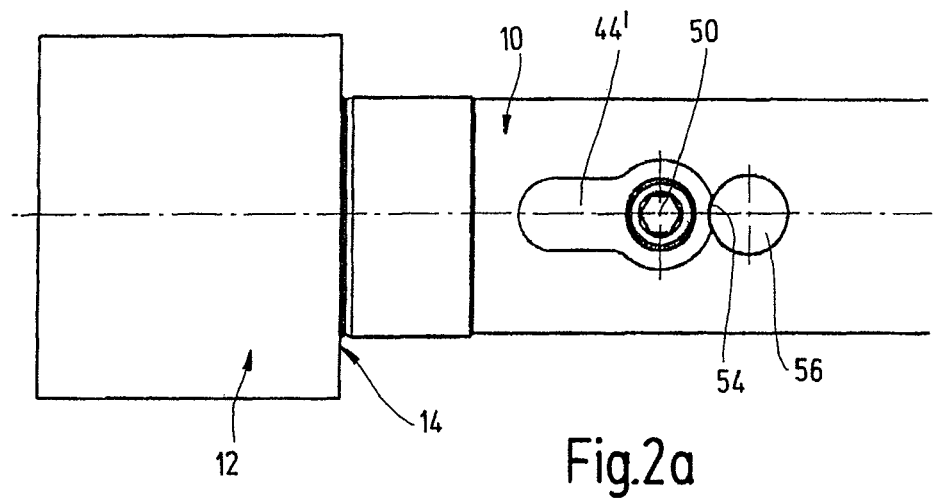
Figure 2B:
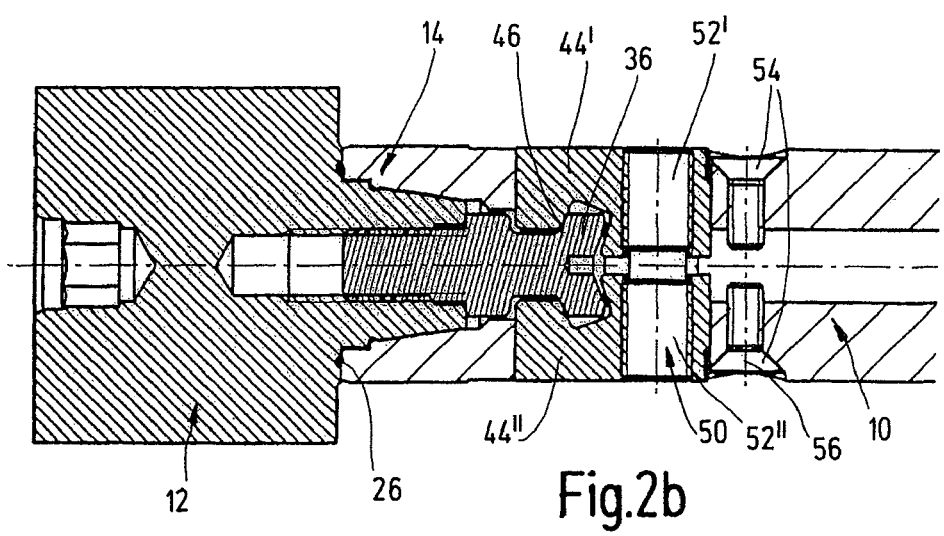
Figure 2C:
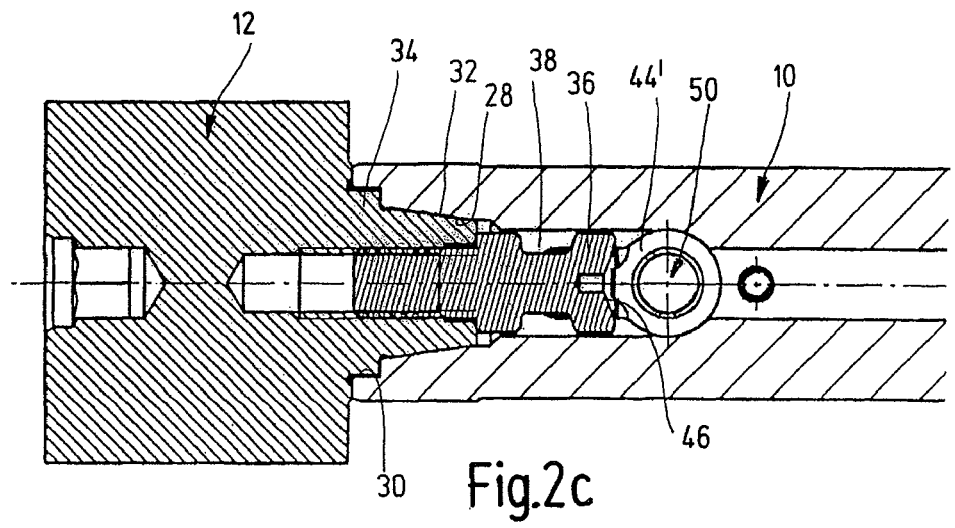

The exemplary embodiment shown in FIGS. 2a to c is intended for smaller diameters of the tool system. The smaller the dimensions, the more difficult it is to accommodate the rolling elements 62 in the clamping elements 44', 44". For this reason, in this case inclined surfaces 64 are provided instead of the rolling elements as ejector portions, which inclined surfaces run on the conical active surface 98 during the release operation and eject the coupling part 22 from the receiver 18. The more slender structural design of the clamping elements in this case makes it possible for the transverse dimension of the clamping-elements 44', 44" to be greater in the region of the differential screw 50 extending through them than in the region of the parts comprising the tie bolt 36 (cf., in particular, FIGS. 2a and e).

A further special feature of the invention consists in the routing of the coolant channels in the region of the joint 14. Three embodiment variants for the coolant routing are to be found in the figure groups 4, 5 and 6. On the first sub-element 10 side, the three embodiment variants correspond. In order to bypass the clamping elements 44', 44", the intake channel 64 arranged centrally on the intake side is divided into four sub-channels 66, which emerge from the second sub-element at a transition location in the region of the end face 20. The three embodiment variants according to FIGS. 4, 5 and 6 differ only in the channel routing on the second sub-element side.

In the case of FIGS. 4a to f, the transition location is constituted in the region of the plane surface 26 by a circumferential groove 70, from which a total of eight obliquely extending supply channels 72 extend from their inlet openings 74 in the region of the groove 70 to their outlet openings 76 in the region of the clamping grooves 78, in the direction of cutting edges 80. It can be seen from FIG. 4f that the supply channels are arranged at a distance from each other in the circumferential direction and have the same course in the tool head.

In the case of the exemplary embodiment according to FIGS. 5a to h, four inlet openings 84 are provided on the plane surface 26 side, which inlet openings are congruent with the outlet openings 68 of the first sub-element 10, and each of which opens into two supply channels 72 within the second sub-element 12 and are routed out from there to the outlet openings 86 in the region of the clamping grooves 88.

In the case of the exemplary embodiment according to FIGS. 6a to h, there are again provided at the transition location four inlet openings 94 which are congruent with the outlet openings 68 and are routed, via supply channels, to central outlet openings 96 in the second sub-element 12, where they are routed outwards, via a distributor piece 100 inserted on the end face and via radial channels formed therein, to the cutting edges 80. The distributor piece 100, which is preferably composed of plastic, has an engagement pin 102, by means of which it is inserted in an end mounting opening 104 of the second sub-element 12 with a predefined rotational orientation. The following may be stated in summary: The invention relates to a joint 14 between two sub-elements 10, 12 of a tool system which rotates about a rotational axis 16, in particular for use in machine tools. The joint 14 comprises an at least partially conical receiver 18, which is arranged on a first sub-element 10 and is coaxial with the rotational axis 16, and which is delimited by an annular end face 20. The second sub-element 12 carries a coupling part 22, which has a coupling pin 24 with a conical surface 32 which is complementary to the conical receiver 18, and has an annular plane surface 26 which faces towards the annular end face 20 and which, in the coupled state, bears against the latter. A tie bolt 36, which in the coupled state engages in a cavity 38 adjoining the receiver 18, projects axially over the free end of the coupling pin 24. Furthermore, clamping means, which can be actuated from the outside, are provided for the purpose of mutual clamping of the sub-elements 10, 12, which clamping means have two clamping elements 44', 44" routed radially in the first sub-element 10 and acting upon the tie-bolt 36, and which are operatively connected to common actuating means 50, by means of which they are adjustable between a release position and a clamping position. According to the invention, the clamping elements are provided with ejector portions 60, which can be equipped with at least one rotatably mounted rolling element 62.

The invention claimed is:

1. Joint between two sub-elements of a tool system which rotates about a rotational axis, in particular for use in machine tools, comprising:
    an at least partially conical receiver arranged on a first sub-element, the receiver being coaxial with the rotational axis and being delimited by an annular end face;
    a coupling part arranged on a second sub-element, the coupling part having a coupling pin with a conical surface which is complementary to the conical receiver, the coupling part having an annular plane surface which faces towards the annular end face and, in the coupled state, bears against the latter;
    a tie bolt projecting axially over the free end of the coupling pin, the tie bolt engaging, in the coupled state, in a cavity adjoining the receiver; and
    clamping means actuated from the outside for the purpose of mutual clamping of the sub-elements, the clamping means having two clamping elements routed radially in the first sub-element arranged opposite to each other relative to the rotational axis, the two clamping elements carrying, in a clamping position, wedge surfaces which engage beneath a conical portion of the tie bolt that is concentric with the rotational axis, the two clamping elements being operatively connected to common actuating means which are adjustable between a release position and a clamping position, the clamping elements being provided with ejector portions which, in the releasing of the clamping elements from the clamping position, with the exertion of an axial force acting in the ejection direction of the coupling part, strike against an active surface of the tie bolt facing towards the clamping elements,
    wherein the active surface on the tie bolt side and/or the ejector portions on the clamping element side is/are equipped with at least one rotatably mounted rolling element.

2. Joint according to claim 1, wherein the active surface on the tie bolt side constitutes an internal cone, and the clamping elements have an ejector portion which, in the release operation, strikes against the internal cone and runs radially on the latter.

3. Joint according to claim 1, wherein the ejector portions are formed, respectively, in the form of a projection or an inclined surface on the clamping elements.

4. Joint according to claim 1, wherein the clamping elements are routed in a floating manner in radial guides of the first sub-element.

5. Joint according to claim 1, wherein the actuating means are realized as a differential screw, respectively having a threaded portion, provided with contradirectional thread leads, which engage in the two clamping elements.

6. Joint according to claim 1, wherein a rotary driving portion is arranged in an intermediate region between the end face and the plane surface on the one hand and between the conical receiver and the conical surface on the other hand.

7. Joint according to claim 6, wherein the rotary driving portions of the receiver and of the coupling pin are realized as polygonal surfaces which are complementary to each other.

8. Joint according to claim 1, wherein the actuating means realized as a differential screw extends through the clamping elements outside the part which receives the tie bolt, and the transverse dimension of the clamping elements in the region of the actuating means is greater than in the region of the parts comprising the tie bolt.

9. Joint according to claim 1, wherein the sub-elements have cooling channels which communicate with each other, at least one intake channel, routed around the clamping elements to a transfer location, being arranged in the first sub-element and at least one supply channel, connected to the transfer location for a plurality of cutting elements, being arranged in the second sub-element.

10. Rotary tool system for use in machine tools, consisting of two sub-elements which are connected to each other at the joint according to claim 1.

11. Rotary tool system according to claim 10, wherein the first sub-element is realized as a machine spindle, an adapter piece or a tool holder, and the second sub-element is realized as a tool head.

12. Joint between two sub-elements of a tool system which rotates about a rotational axis, in particular for use in machine tools, comprising:
- an at least partially conical receiver arranged on a first sub-element, the receiver being coaxial with the rotational axis and being delimited by an annular end face;
- a coupling part arranged on a second sub-element, the coupling part having a coupling pin with a conical surface which is complementary to the conical receiver, the coupling part having an annular plane surface which faces towards the annular end face and, in the coupled state, bears against the latter;
- a tie bolt projecting axially over the free end of the coupling pin, the tie bolt engaging, in the coupled state, in a cavity adjoining the receiver; and
- clamping means actuated from the outside for the purpose of mutual clamping of the sub-elements, the clamping means having two clamping elements routed radially in the first sub-element arranged opposite to each other relative to the rotational axis, the two clamping elements carrying, in a clamping position, wedge surfaces which engage beneath a conical portion of the tie bolt that is concentric with the rotational axis, the two clamping elements being operatively connected to common actuating means which are adjustable between a release position and a clamping position, the clamping elements being provided with ejector portions which, in the releasing of the clamping elements from the clamping position, with the exertion of an axial force acting in the ejection direction of the coupling part, strike against an active surface of the tie bolt facing towards the clamping elements,
- wherein the active surface on the tie bolt side and/or the ejector portions on the clamping element side is/are equipped with at least one rotatably mounted rolling element, and the rolling elements are realized in a spherical, barrel-shaped or cylindrical form.

13. Joint between two sub-elements of a tool system which rotates about a rotational axis, in particular for use in machine tools, comprising:
- an at least partially conical receiver arranged on a first sub-element, the receiver being coaxial with the rotational axis and being delimited by an annular end face;
- a coupling part arranged on a second sub-element, the coupling part having a coupling pin with a conical surface which is complementary to the conical receiver, the coupling part having an annular plane surface which faces towards the annular end face and, in the coupled state, bears against the latter;
- a tie bolt projecting axially over the free end of the coupling pin, the tie bolt engaging, in the coupled state, in a cavity adjoining the receiver; and
- clamping means actuated from the outside for the purpose of mutual clamping of the sub-elements, the clamping means having two clamping elements routed radially in the first sub-element arranged opposite to each other relative to the rotational axis, the two clamping elements carrying, in a clamping position, wedge surfaces which engage beneath a conical portion of the tie bolt that is concentric with the rotational axis, the two clamping elements being operatively connected to common actuating means which are adjustable between a release position and a clamping position, the clamping elements being provided with ejector portions which, in the releasing of the clamping elements from the clamping position, with the exertion of an axial force acting in the ejection direction of the coupling part, strike against an active surface of the tie bolt facing towards the clamping elements,
- wherein arranged in the first sub-elements are stops which delimit the motion path of the clamping elements in the release operation, and the stops are constituted by cap screws which by means of their head engage in the motion path of the clamping elements.

14. Joint according to claim 13, wherein the active surface on the tie bolt side constitutes an internal cone, and the clamping elements have an ejector portion which, in the release operation, strikes against the internal cone and runs radially on the latter.

15. Joint according to claim 13, wherein the ejector portions are formed, respectively, in the form of a projection or an inclined surface on the clamping elements.

16. Joint according to claim 13, wherein the clamping elements are routed in a floating manner in radial guides of the first sub-element.

17. Joint according to claim 13, wherein the actuating means are realized as a differential screw, respectively having a threaded portion, provided with contradirectional thread leads, which engage in the two clamping elements.

18. Joint according to claim 13, wherein a rotary driving portion is arranged in an intermediate region between the end face and the plane surface on the one hand and between the conical receiver and the conical surface on the other hand.

19. Joint according to claim 18, wherein the rotary driving portions of the receiver and of the coupling pin are realized as polygonal surfaces which are complementary to each other.

20. Joint according to claim 13, wherein the actuating means realized as a differential screw extends through the clamping elements outside the part which receives the tie bolt, and the transverse dimension of the clamping elements in the region of the actuating means is greater than in the region of the parts comprising the tie bolt.

21. Joint according to claim 13, wherein the sub-elements have cooling channels which communicate with each other, at least one intake channel, routed around the clamping elements to a transfer location, being arranged in the first sub-element and at least one supply channel, connected to the transfer location for a plurality of cutting elements, being arranged in the second sub-element.

22. Rotary tool system for use in machine tools, consisting of two sub-elements which are connected to each other at the joint according to claim 13.

23. Rotary tool system according to claim 22, wherein the first sub-element is realized as a machine spindle, an adapter piece or a tool holder, and the second sub-element is realized as a tool head.

* * * * *